Nov. 15, 1955 C. STEWART 2,724,115
TRACKING SYSTEM

Filed Sept. 25, 1952 2 Sheets—Sheet 1

INVENTOR.
CLYDE STEWART
BY
ATTORNEY

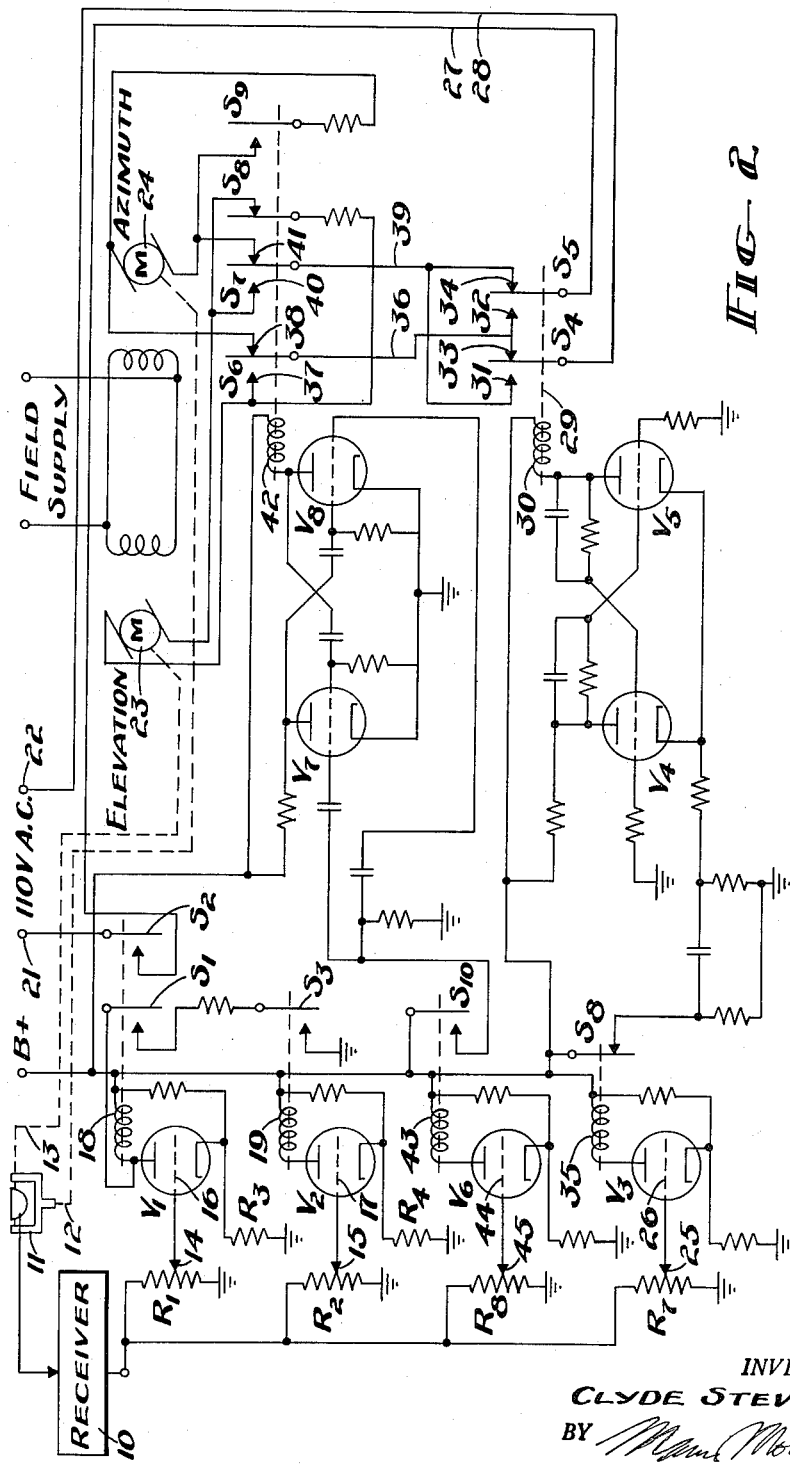

United States Patent Office 2,724,115
Patented Nov. 15, 1955

2,724,115

TRACKING SYSTEM

Clyde Stewart, Cedar Rapids, Iowa, assignor to Collins Radio Company, Cedar Rapids, Iowa, a corporation of Iowa Application September 25, 1952, Serial No. 311,470

8 Claims. (Cl. 343—117)

This invention relates in general to tracking means, and in particular to a system for tracking a slowly moving target.

In general when it is desired to track a moving target with a radar or radiometric receiver, it is customary to generate separate azimuth and elevation signals to develop a sense of error. In other words, two separate tracking systems are used. One controls the elevation position of the tracking device, and the other one controls the azimuth position of the tracking device.

It is an object of this invention to provide a single error control signal which is switched alternately from an azimuth drive to an elevation drive motor.

Another object of this invention is to provide a tracking mechanism wherein a single error signal generating device is required.

Further objects, features and advantages of this invention will become apparent from the following description and claims when read in view of the drawings, in which;

Figure 2 is a schematic representation of one specific embodiment of the invention.

Figure 1A:
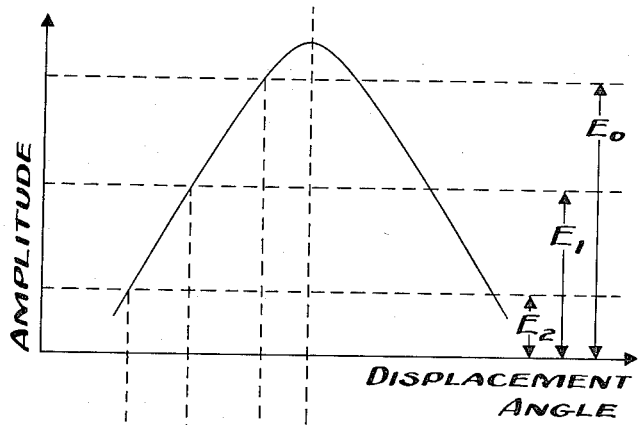
Figure 1A is a plot of amplitude versus displacement from target.

Figure 1A is a side view of a response curve of received signal amplitude versus displacement from target. This curve would be obtained by plotting amplitude of received energy from a target versus displacement angle from the target. In other words, if the receiving antenna is pointed directly at the target, the maximum input will be received and if it is displaced to either side, or above or below, the intensity of the signal will be proportionately decreased. This is also illustrated in Figure 1B which is a top view showing that the curve of Figure 1A is a symmetrical one.

Suppose, for example, that the moving target is the sun and that a radiometric receiver is being used to track it. Such a system is described in patent application "Visual Display for a Radiometric Receiver," Richard M. Ringoen, Serial Number 260,441, filed December 7, 1951.

Figure 1B:
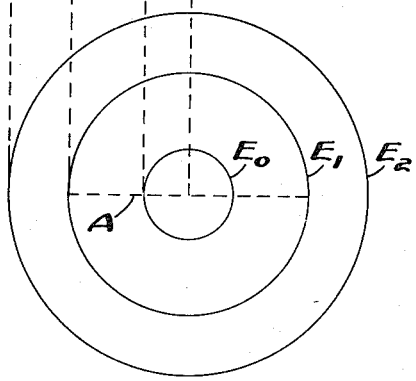
Figure 1B is a top view of the same curve.

The present invention proposes to utilize the symmetry of the curves shown in Figures 1A and 1B to allow azimuth and elevation control motors to be alternately connected to the receiving means and driven until the error is within certain defined limits.

As shown in Figure 2, a receiver 10 receives an input from an antenna 11 which is mounted on an azimuth axis 12 and an elevation axis 13. The receiver detects the amplitude of the incoming energy and connects it to resistors $R_1$ and $R_2$ which have slide contacts 14 and 15, respectively, that are connected to the grids 16 and 17 of tubes $V_1$ and $V_2$. Relays 18 and 19, respectively, are connected in the plate circuits of tubes $V_1$ and $V_2$. The relay 18 controls the position of switches $S_1$ and $S_2$ and the relay 19 controls the position of switch $S_3$. The relays 18 and 19 are connected to B plus. Resistors $R_3$ and $R_4$ are connected in the cathode circuits of tubes $V_1$ and $V_2$ and provide fixed bias for them.

The tube $V_2$ is biased so that a signal of amplitude $E_2$ will energize relay 19. $E_2$ is a relatively low amplitude as shown in Figure 1B. Thus, when a signal of amplitude less than $E_2$ is received, the switch $S_3$ will be open. Let it be assumed that the antenna 11 is positioned so that a signal of intensity greater than $E_2$ is being received. This will cause the relay 19 to close the switch $S_3$.

The tube $V_1$ is biased so that relay 18 is energized at a signal level of $E_0$, a relatively high amplitude as shown in Figure 1B. This causes switches $S_1$ and $S_2$ to be closed and forms an interlock that will remain energized until the signal falls below $E_2$. This is true because once relays 18 and 19 have both been energized, the switches $S_1$, $S_2$ and $S_3$ will remain closed even though the bias on tube $V_1$ falls below the closing level. This is true because of the current path through $S_1$ and $S_3$ to ground which passes through relay 18. Of course, if the signal falls below $E_2$, the relay 19 will open switch $S_3$ and the system will be de-energized.

When $S_2$ is closed it connects terminals 21 and 22 together which apply voltage to the drive motors.

Thus, the apparatus shown in Figure 2 provides an interlock for supplying a motor supply voltage from the terminals 21 and 22. The invention provides means for oscillating one of the drive motors back and forth between the limits of $E_2$.

The antenna 11 has its elevation shaft 13 connected to an elevation drive motor 23 and its azimuth shaft 12 connected to an azimuth drive motor 24.

A resistor $R_7$ receives an input from the receiver 10 and a slide contact 25 engages the resistor and is connected to grid 26 of a tube $V_3$.

The terminals 21 and 22 at any time after $S_2$ has been actuated, 110 volt A. C. is supplied to the leads 27 and 28. A pair of switches $S_4$ and $S_5$ are connected to the leads 27 and 28 and are ganged together by a shaft 29 which is controlled by a relay 30. The switches $S_4$ and $S_5$ are always in engagement with a pair of contacts, either 31 and 32, or 33 and 34.

The contacts 32 and 33 are connected to a lead 36 that is connected to a switch $S_6$ movable between a pair of contacts 37 and 38. The contacts 31 and 34 are connected to a lead 39 which is connected to a switch $S_7$ movable between contacts 40 and 41.

The switches $S_6$ and $S_7$ move together and are controlled by a relay 42 which is described in detail hereafter. The contacts 37 and 40 are connected to the elevation drive motor 23 and contacts 38 and 41 are connected to the azimuth drive motor 24.

Thus, as shown in Figure 2 the elevation drive motor 23 is connected to the power supply and will be operating. One of the motors 23 and 24 is operating at all times. The switches $S_4$ and $S_5$ are reversing switches to cause the direction of rotation of the motor being energized to reverse. The relay 30 thus controls the direction of rotation of the motor being operated.

A relay 35 is mounted in the plate circuit of the tube $V_3$ and controls a switch $S_8$ that is coupled to a trigger circuit formed with tubes $V_4$ and $V_5$. The switch $S_8$ is connected to B plus and is coupled to the cathodes of tubes $V_4$ and $V_5$. The contact 25 is adjusted to a position such that the relay 35 is energized at an amplitude slightly less than $E_1$, shown in Figure 1B, a voltage level intermediate between $E_0$ and $E_2$.

When the relay 35 is de-energized the switch $S_8$ is closed and a pulse of voltage from the B plus terminal is furnished to trigger the trigger circuit, thus causing the relay 30 to be actuated and to reverse the direction of the motor being driven. Assuming for the moment that only one drive motor is being actuated, the reversing circuit will continually oscillate the drive motor between limits of $E_1$ shown by the dotted line A in Figure 1B. This continues as long as the switches $S_6$ and $S_7$ remain in the same position.

The switching circuit switches the control voltage from the elevation to the azimuth motor and vice versa. It is assumed that the reversing action of the relay 30 is fast as compared to the movement of the target. While the elevation motor is centering the antenna 11 on the target in elevation, it is probable that the target has moved out of position in azimuth so it must be re-centered in this coordinate.

The relay 42 accomplishes this by moving the switches $S_6$ and $S_7$ between the contacts 40 and 41 and 37 and 38, respectively. A second pair of switches $S_8$ and $S_9$ are controlled by the relay 42 with one of them always being closed and the other always open so as to short out the armature of the motor which is not operating to provide dynamic braking. For example, if the error signal is switched from the elevation motor to the azimuth motor the switch $S_9$ closes, thus shorting out the armature of the elevation motor and the switch $S_8$ opens allowing the azimuth motor to operate.

In order to accomplish switching from the azimuth to elevation motor, the relay 42 is controlled by a slow free running multi-vibrator consisting of the triode tubes $V_7$ and $V_8$. The period of this multi-vibrator should normally be one-half or one-third times the period required for the target to move between regious of signal strength $E_1$.

Thus, the relay 42 will be alternatively energized and de-energized to switch from the elevation to the azimuth motor. Such multi-vibrator circuits are well known to those skilled in the art and will not be described in detail herein. A tube $V_6$ has its control grid 44 connected to a slide contact 45 that engages the resistor $R_8$. The relay 43 is in the plate circuit of the tube $V_6$ and actuates a switch $S_{10}$. The tube $V_6$ has its basis adjusted so that the relay 43 will be energized at an amplitude slightly higher than $E_0$ with reference to Figure 1B. This closes the switch $S_{10}$ near maximum signal level to allow a pulse from B plus to be supplied to the grids of the multi-vibrator tubes $V_7$ and $V_8$ to trigger the multi-vibrator if it has nearly completed its normal period. This switches the motors near the peak of the response curve. If the multi-vibrator is not near the end of its period it will not be triggered by the pulse from the switch $S_{10}$ but will complete its period before shifting to the other motor.

It is seen that the apparatus described and shown continually centers up the antenna in one coordinate while it is drifting out in the other. It then shifts coordinates and makes a correction for the drift in the second coordinate. Each time the motor will stop with nearly zero error in a given coordinance. It is also to be noted that all nutation and use of switch tubes are eliminated and only one error signal channel is required and is used by both elevation and azimuth motors. This substantially simplifies the tracking problem while still maintaining a relatively high degree of accuracy.

Although the invention has been described with respect to particular embodiments thereof, it is not to be so limited as changes and modifications may be made therein which are within the full intended scope of the invention, as described by the appended claims.

I claim:

1. A tracking system comprising, an antenna mounted on elevation and azimuth axes, a receiver receiving radiant energy from said antenna, an elevation motor connected to the elevation axis of said antenna, an azimuth motor connected to azimuth axis of said antenna, a motor drive voltage, a motor switching circuit receiving an input from said receiver and alternately connecting the motor drive voltage to the elevation and to the azimuth motor, a motor reversing circuit connected to the elevation and azimuth motors and receiving an input from said receiver to periodically reverse the direction of rotation of said motors, and an interlock receiving an input from said receiver and connected to said motor reversing and motor switching circuits to render them operative above a certain minimum signal level.

2. A tracking system comprising, an antenna mounted on elevation and azimuth axes, elevation and azimuth motors connected, respectively, to the elevation and azimuth axes, a receiver of radiant energy receiving an input from said antenna, a motor voltage supply, a motor switching circuit receiving an input from said receiver and periodically connecting said azimuth and elevation motors to the receiver output and to said motor voltage supply, a motor reversing circuit connected to said receiver and said elevation and azimuth motors to periodically reverse their directions of rotation, and an interlock circuit receiving an input from said receiver and connected to said motor reversing and motor switching circuits to connect them when the receiver output is above a predetermined amplitude.

3. In apparatus according to claim 2 wherein said interlock circuit comprises, a pair of tubes, first and second resistors connected to said receiver and to ground, the control grids of said first and second tubes tapped to said resistors, a first relay mounted in the plate circuit of the first tube, a second relay mounted in the plate circuit of the second tube, a first pair of switches controlled by the first relay, a third switch controlled by said second relay, said first and second switches connected together to provide an interlock, and said second switch controlling a voltage supply.

4. In apparatus according to claim 2 wherein said motor reversing circuit comprises, a first tube, a first resistor connected to said receiver, the control grid of said first tube tapped to said first resistor, a first relay mounted in the plate circuit of said first tube, a first switch controllable by said first relay, a multi-vibrator circuit connected to said first switch, said first switch connected to a direct voltage supply, a second relay connected to said multi-vibrator, an alternating power supply, a pair of switches controlled by said second relay to reverse the phase of said power supply, and said second and third switches connecting said alternating power supply to said elevation and azimuth motors.

5. In apparatus according to claim 2 wherein said motor switching circuit comprises a first tube receiving an input from said receiver, a first relay connected in the plate circuit of said first tube, a first switch controlled by said first relay, a direct power supply connected to said first switch, a multi-vibrator circuit connected to said first switch, a second relay mounted in said multi-vibrator circuit, second and third switches controlled by said second relay, an alternating power supply connected to said second and third switches, and said second and third switches connected to said azimuth and elevation motors so as to switch the alternating power supply from one to the other upon actuation by the second relay.

6. A tracking mechanism comprising, an antenna mounted on elevation and azimuth axes, elevation and azimuth motors connected to said elevation and azimuth axes, a receiver of radiant energy receiving the output of said antenna, a motor reversing circuit receiving an output from said receiver and comprising a first tube, a first relay mounted in the plate circuit of said first tube, a first switch controlled by said first relay, a first multi-vibrator circuit controlled by said first switch, a second relay connected in the multi-vibrator circuit, second and third switches controlled by said second relay, a motor drive voltage connected to said second and third switches, a direct biasing voltage connected to said first switch, a motor switching circuit connected to said second and third switches and comprising a second tube receiving an input from said receiver, a third relay mounted in the plate circuit of said third tube, a fourth switch controlled by said third relay, a second multi-vibrator circuit connected to said fourth switch, the direct voltage supply connected to said second multi-vibrator, a fourth relay mounted in the second multi-vibrator circuit, fifth, sixth, seventh and eighth switches controlled by said fourth relay, said fifth and sixth switches connected to said third and fourth switches, and the azimuth and elevation motors connected to said fifth, sixth, seventh, and eighth switches.

7. A tracking apparatus comprising, an antenna mounted on elevation and azimuth axes, a receiver receiving an input from said antenna, elevation and azimuth motors connected to said elevation and azimuth axes, an interlock circuit connected to said receiver and energized above a predetermined relatively low output from said receiver, a motor reversing circuit connected to said interlock and to said elevation and azimuth motors for periodically reversing their directions of rotation, a motor switch circuit connected to said receiver and periodically switching a motor supply voltage from the elevation to the azimuth motors, and said motor switching circuit shorting the armature of the inactive motor so as to provide dynamic breaking.

8. A tracking mechanism comprising, an antenna mounted on elevation and azimuth axes, elevation and azimuth motors connected to said elevation and azimuth axes, an interlock circuit receiving the output of said receiver and energized above a certain predetermined receiver output, motor switching and motor reversing circuits connected to said interlock circuit and energized thereby, said motor switching circuit comprising a timing element which receives an input from said receiver to modify its natural period, said motor reversing circuit supplying an input to said motor switching circuit, said motor switching circuit containing a second timing element, said second timing element receiving an input from said receiver to vary its natural period, and said motor switching circuit controlling a motor supply voltage and connecting it to said elevation and azimuth motors.

References Cited in the file of this patent
UNITED STATES PATENTS

| | | |
|---|---|---|
| 2,412,612 | Godet | Dec. 17, 1946 |
| 2,473,175 | Ridenour | June 14, 1949 |
| 2,490,660 | Speer | Dec. 6, 1949 |
| 2,605,465 | Brailsford et al. | July 29, 1952 |